(12) United States Patent
Savoly et al.

(10) Patent No.: US 6,863,837 B2
(45) Date of Patent: Mar. 8, 2005

(54) DISPERSANT COMPOSITION

(75) Inventors: Arpad Savoly, Martinsville, NJ (US); Dawn P. Elko, Flemington, NJ (US); Bennie Veal, Rome, GA (US); Michelle L. McMahon, Sellersville, PA (US); David B. Heller, Jr., North Wales, PA (US)

(73) Assignee: GEO Specialty Chemicals, Inc., Cleveland, OH (US)

( * ) Notice: Subject to any disclaimer, the term of this patent is extended or adjusted under 35 U.S.C. 154(b) by 0 days.

(21) Appl. No.: 10/212,470

(22) Filed: Aug. 5, 2002

(65) Prior Publication Data

US 2004/0020108 A1 Feb. 5, 2004

(51) Int. Cl.$^7$ .................................................. C02K 3/00
(52) U.S. Cl. ......................... 252/1; 106/638; 106/713; 106/725; 106/739
(58) Field of Search ............................. 562/88, 89, 90; 106/638, 713, 725, 739; 252/1

(56) References Cited

U.S. PATENT DOCUMENTS

| | | | |
|---|---|---|---|
| 2,121,845 A | * 6/1938 | Wernicke ..................... | 562/33 |
| 2,141,569 A | 12/1938 | Tucker | |
| 2,227,999 A | 1/1941 | Brandt et al. | |
| 2,529,602 A | 11/1950 | Frohmader | |
| 3,067,243 A | * 12/1962 | Richter ....................... | 562/88 |
| 3,193,575 A | 7/1965 | Nebel et al. | |
| 3,277,162 A | 10/1966 | Johnson | |
| 3,954,677 A | * 5/1976 | Law .............................. | 516/77 |
| 4,290,973 A | * 9/1981 | Aude et al. .................... | 562/33 |
| 4,604,404 A | * 8/1986 | Munson et al. ............. | 514/494 |
| 5,179,170 A | 1/1993 | Ohtsu et al. | |
| 5,534,166 A | * 7/1996 | Brueckmann et al. ......... | 8/557 |
| 6,027,561 A | * 2/2000 | Gruber et al. .............. | 106/718 |

FOREIGN PATENT DOCUMENTS

| | | | |
|---|---|---|---|
| JP | 04476256 | * | 7/1989 |
| JP | 03199149 | * | 8/1991 |

\* cited by examiner

*Primary Examiner*—Cephia D. Toomer
(74) *Attorney, Agent, or Firm*—Rankin, Hill, Porter & Clark LLP

(57) ABSTRACT

The present invention provides a sulfonated coal tar distillate salt polymer that is a condensation product of an aldehyde, preferably formaldehyde, and a sulfonated middle fraction obtained during coal tar distillation. The middle fraction includes from about 40% to about 95% by weight naphthalene and from about 5% to about 60% by weight of a plurality of compounds selected from the group consisting of quinoline, indene, biphenyl, indane, acenaphthene, anthracene, phenanthrene, methyl naphthalene, cresol, phenol, xylenol, and tetralin. The present invention also provides a method of forming a sulfonated coal tar distillate salt polymer. The method includes sulfonating the middle fraction to form a middle fraction sulfonic acid mass, optionally adding a first portion of water to the middle fraction sulfonic acid mass to form a mixture, reacting the mixture and an aldehyde to form a condensate, optionally adding a second portion of water to dilute the condensate, and adding a base to form a sulfonated middle fraction salt polymer. Sulfonated middle fraction salt polymers formed in accordance with the method of the invention are useful as dispersants and plasticizers in aqueous cementitious slurries.

6 Claims, No Drawings

DISPERSANT COMPOSITION

FIELD OF INVENTION

The present invention relates to a dispersant composition, a method of forming a dispersant composition, and an aqueous cementitious slurry containing a dispersant composition.

BACKGROUND OF THE INVENTION

It has been known for many years that naphthalene sulfonic acid can be condensed with formaldehyde to form useful reaction products. See, e.g., Frohmader, U.S. Pat. No. 2,529,602, and Johnson, U.S. Pat. No. 3,277,162. Geo Specialty Chemicals, Inc. of Cleveland, Ohio, the assignee of the present application, markets a line of sulfonated naphthalene formaldehyde condensate products under the LOMAR® mark that are useful in a variety of applications, including as dispersants and/or plasticizers in the manufacture of aqueous cementitious products (e.g., concrete and gypsum), and in the oil field, ceramics and polymerization industries.

The naphthalene used in the manufacture of prior art sulfonated naphthalene formaldehyde condensate products is relatively pure, typically comprising greater than 96% naphthalene by weight. Such naphthalene will have a melting point of at least about 78° C., and more preferably at least about 78.5° C.

Naphthalene is principally derived from the fractional distillation and recrystallization of coal tar, which is a by-product obtained during the production of coke used in the steel industry. The "middle fraction" obtained during the fractional distillation of coal tar includes a mixture of "light oils" that boil within a range of from about 200° C. and 250° C. Because the middle fraction is relatively rich in naphthalene (i.e., typically containing from about 50% to about 75% naphthalene by weight), it is sometimes referred to as naphthalene oil or dilute naphthalene oil. In addition to naphthalene, naphthalene oil comprises a complex mixture of hundreds of compounds, primarily multi-ringed polynuclear aromatic hydrocarbons. Naphthalene oil must be further refined and processed in order to separate the naphthalene from these other compounds. Because the refinement of naphthalene oil is relatively expensive, a substantial volume of naphthalene oil is burned to generate heat.

SUMMARY OF INVENTION

The present invention provides a water-soluble dispersant composition that is derived from the middle fraction obtained during the distillation of coal tar. The dispersant composition according to the invention comprises a polymer having a weight average molecular weight of from about 2,000 to about 40,000 that is a condensation product of an aldehyde and a sulfonated middle fraction obtained during the distillation of coal tar. The middle fraction preferably comprises from about 40% to about 95% by weight, and more preferably from about 50% to about 75% by weight, naphthalene and from about 5% to about 60% by weight, and more preferably from about 25% to about 50% by weight, of a plurality of compounds selected from the group consisting of quinoline, indene, biphenyl, indane, acenaphthene, anthracene, phenanthrene, methyl naphthalene, cresol, phenol, xylenol, and tetralin.

The present invention also provides a method of forming a water-soluble dispersant from the middle fraction obtained during coal tar distillation. The method comprises sulfonating the middle fraction to form a middle fraction sulfonic acid mass, optionally adding a first portion of water to the middle fraction sulfonic acid mass, feeding an aldehyde to the middle fraction sulfonic acid mass to form a middle fraction sulfonic acid mass condensate, optionally adding a second portion of water to dilute the middle fraction sulfonic acid mass condensate, and adding a base to form a middle fraction sulfonic acid salt polymer. The middle fraction sulfonic acid salt polymer obtained in accordance with the method of the invention is useful as a dispersant in aqueous cementitious slurries, such as hydraulic cement and gypsum.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

As noted above, coal tar is generated during the production of coke used in steel making. Crude coal tar is a black sticky substance that comprises a mixture of hundreds of organic compounds. Coal tar is initially processed by distillation into three liquid fractions and a residue called pitch. The light fraction generally comprises up to about 5% of the crude coal tar by weight and distills at a temperature up to about 200±10° C. The middle fraction, which is sometimes referred to as the naphthalene oil fraction or simply naphthalene oil, comprises about 20% of the crude coal tar by weight and distills at a temperature from about 200±10° C. to about 250±10° C. The heavy fraction, which is sometimes referred to as the creosote faction, generally comprises up to about 20% of the crude coal tar by weight and distills at a temperatures above about 250±10° C.

It will be appreciated that the exact composition of the middle fraction will be dependent upon the source of the coal tar being distilled and the processing conditions used by the distiller. Typically, the middle fraction obtained during coal tar distillation comprises a mixture comprising from about 40% to about 95% by weight naphthalene and from about 5% to about 60% by weight of a plurality of compounds selected from the group consisting of quinoline, indene, biphenyl, indane, acenaphthene, anthracene, phenanthrene, methyl naphthalene, cresol, phenol, xylenol, and tetralin. Unless otherwise defined, throughout the instant specification and in the appended claims, the term "middle fraction" means the fraction of crude coal tar that distills at a temperature from about 200±10° C. to about 250±10° C. and contains from about 40% to about 95% by weight naphthalene and from about 5% to about 60% by weight of a plurality of compounds selected from the group consisting of quinoline, indene, biphenyl, indane, acenaphthene, anthracene, phenanthrene, methyl naphthalene, cresol, phenol, xylenol, and tetralin.

More preferably, the middle fraction will comprise from about 50% to about 75% by weight naphthalene and from about 25% to about 50% by weight, of a plurality of compounds selected from the group consisting of quinoline, indene, biphenyl, indane, acenaphthene, anthracene, phenanthrene, methyl naphthalene, cresol, phenol, xylenol, and tetralin. A suitable middle fraction for use in the invention is available from Coopers Creek Chemical Corporation of West Conshohocken, Pa. as 60% Naphthalene Oil. The exact composition of this middle fraction is not known, but it is believed to comprise about 60±10% by weight naphthalene, about 5±3% 2-methyl naphthalene, about 4±2% indane, about 3.5±2% phenol/o-cresol, about 3±2% 2,4-2,5 xylenol, up to about 2±1% by weight each of indene, 1-methyl naphthalene, quinoline, biphenyl, 2,3 xylenol, and the balance comprising a mixture of hundreds of other hydrocarbons, including multi-ringed polynuclear aromatic hydrocarbons (e.g., acenaphthene, anthracene, phenanthrene, tetralin, 2,5 xylenol, and 2,4 xylenol). This middle fraction has a melting point of about 60° C., which is significantly below the melting point of relatively pure naphthalene used in prior art processes (typically about 78.5° C. or higher).

In accordance with the method of the invention, the middle fraction is sulfonated to form a middle fraction sulfonic acid mass. Sulfonation of the middle fraction can be accomplished by conventional naphthalene sulfonation methods, which are known. Sulfonation of the middle fraction is preferably accomplished by heating the middle fraction to a temperature of from about 80° C. to about 85° C. and then gradually feeding a sulfonating agent to the heated middle fraction. Conventional sulfonating agents such as concentrated sulfuric acid can be used, but the use of fuming sulfuric acid, which is sometimes called oleum, is preferred. The presently most preferred sulfonating agent for use in the invention is 20% oleum (i.e., $H_2SO_4$ with an average of about 20% by weight free $SO_3$).

Once the sulfonating agent feed has been completed, the mass is preferably heated to a temperature of about 150° C. to about 155° C. and held for at least about two, and more preferably at least about four hours. The middle fraction sulfonic acid mass is then permitted to cool to about 75° C.

Optionally, a first portion of water can be slowly added to the middle fraction sulfonic acid mass to form a mixture. Water is preferably added to reduce the viscosity of the sulfonic acid mass, which will allow for greater ease of mixing during a later aldehyde addition. The presence of water is also beneficial to prevent uncontrolled exotherms from occurring during a later condensation reaction. The amount of water added is not per se critical, but it is preferably to add the least amount of water necessary. Typically, an amount of water equal to about 30% by weight of the sum of the crude coal tar distillate and sulfonating agent is sufficient. Preferably, distilled water is used. To reduce the likelihood of uncontrollable exotherms, it is preferable to keep the temperature of the middle fraction sulfonic acid mass below about 80° C. during the addition of the first portion of water.

The next step in the method of the invention is to feed an aldehyde to the mixture to form a middle fraction sulfonic acid mass condensate. Typically, a solution of an aldehyde in water is used. The concentration of the aldehyde used in not per se critical. The preferred aldehyde for use in the invention is formaldehyde, but other aldehydes such as paraformaldehyde and glutaraldehyde, for example, can be used. Presently, a 37% (by weight) solution of formaldehyde in water is most preferred. The pot temperature is preferably maintained between about 80° C. and about 90° C. during the aldehyde addition. Once all the aldehyde has been fed in, the temperature of the mass is increased to about 105° C. to encourage complete condensation. The mass is preferably held at this temperature until the free aldehyde level is less than about 0.1% by weight. The free aldehyde level can be determined by titration. There is a quantitative liberation of sodium hydroxide when an aldehyde reacts with sodium sulfite to form an aldehydebisulfate adduct. The liberated NaOH can be titrated to a specified pH using a 0.5 HCL solution.

Once the free aldehyde level is within specification, the temperature of the middle fraction sulfonic acid mass condensate is reduced to about 70° C. and an optional second portion of water may be added to dilute the middle fraction sulfonic acid mass condensate. Addition of the second portion of water is preferred because it reduces the viscosity of the mass, which assists in mixing.

After the optional second portion of water has been added, a base is added to form a middle fraction sulfonic acid salt polymer. Preferably, the base is sodium hydroxide (NaOH), but other bases can also be used. Enough base should be added to raise the pH of the mass to from about 7 to about 9. The temperature of the mass is preferably maintained within about 70° C. to about 80° C. during the addition of the base. Once the base has been added, a filter aid such as diatomaceous earth can be added to the mass, and the middle fraction sulfonic acid salt polymer can be recovered by vacuum filtration.

The resulting middle fraction sulfonic acid salt polymer formed in accordance with the method of the invention will be a dark amber liquid with a bland odor. It can be stored indefinitely but should be protected from freezing during storage and transit. Typical weight average molecular weights for the polymer are from about 2,000 to about 40,000, and more preferably from about 7,000 to about 22,000, and most preferably about 8,500. The product will typically have a moisture content of about 50%, have a pH of about 9, and will contain less than about 0.1% free formaldehyde.

The middle fraction sulfonic acid salt polymer formed in accordance with the method of the invention is useful as a dispersant in a broad range of applications. For example, the dispersant can be used to improve the plasticity of aqueous cementitious slurries that hydrate and thus harden by the action of water (e.g., Portland cement, concrete, mortar and gypsum). The polymer can be used as a direct replacement for sulfonated naphthalene/aldehyde condensate salt polymers in such applications.

The following examples are intended only to illustrate the invention and should not be construed as imposing limitations upon the claims.

EXAMPLE 1

192 grams (~1.50 moles) of a middle fraction obtained during coal tar distillation sold as Naphthalene Oil 60% by Coopers Creek Chemical Corporation was charged to a 1000 ml four neck round bottom flask equipped with an overhead stirrer, condenser, thermocouple, and addition funnel. The middle fraction was heated to a temperature of about 85° C. and agitated. Once the temperature set point was reached, 140 grams of 20% oleum (~1.50 moles) was fed into the flask over 2.5 hours with constant agitation. The batch temperature was maintained below 90° C.

Once the oleum feed was complete, the batch was heated to 155° C. and held for 4.0 hours. The batch was then cooled to about 75° C. A first 100 gram (~5.55 moles) portion of distilled water was slowly added to the middle fraction sulfonic acid mass under constant stirring. The temperature was maintained below about 80° C. throughout this addition. Once the addition of the first portion of water was complete, 119 grams of 37% by weight formaldehyde (~1.47 moles) in water was added over 30 minutes. The temperature was maintained within about 80° C. to about 90° C. during the feed.

The batch temperature was then gradually increased to about 105° C. The temperature was maintained for about four hours, until the free formaldehyde level was determined to be less than 0.1% by weight by titration. The temperature was then lowered to about 70° C. and a second 170 gram portion of distilled water (~9.44 moles) was added under constant stirring to reduce the viscosity of the mixture. 120 grams of 50% by weight sodium hydroxide (~1.40 moles) was then added to raise the pH of the batch to about 9. The temperature was maintained at about 75° C. A diatomaceous earth filter aid was added to the batch, and the product was vacuum filtered and transferred to a brown 2.5L bottle. The product was a clear, dark, amber liquid having a moisture content of about 50% by weight, a sodium sulfate content of about 12% by weight, a pH of about 9.0, a free formaldehyde content of about 0.09% by weight, and a number average molecular weight of about 8,500.

COMPARATIVE EXAMPLE 2

A mini-slump cone was fabricated from polytetrafluoroethylene (PTFE) polymer so as to have the following critical dimensions: top opening diameter 20 mm; base opening diameter 40 mm; length of inner wall from base opening to top opening 60 mm. The base of the cone was placed on a glass plate.

100 grams of Portland cement was added to a disposable beaker. 35 grams of distilled water was added to the beaker and the Portland cement and distilled water were mixed together for about 30 seconds by hand using a metal spatula to produce an aqueous slurry. 1.0 ml of a sulfonated naphthalene formaldehyde condensate dispersant available from Geo Specialty Chemicals, Inc. of Cleveland, Ohio as LOMAR® D was added to the slurry using a disposable syringe, and then the slurry was hand-mixed for an additional 20 seconds. The cement slurry was then poured into the mini-slump cone discussed above until the mini-slump cone was filled to the top with the cement slurry. The mini-slump cone was lifted quickly and evenly from the glass plate, allowing the cement slurry to flow onto the glass plate. After waiting one minute, the diameter of the cement slurry patty formed was then measured. Generally speaking, the less viscous the cement slurry, the larger the slump diameter. The slump diameter was 17.3 cm.

EXAMPLE 3

100 grams of Portland cement was added to a disposable beaker. 35 grams of distilled water was added to the beaker and the Portland cement and distilled water were mixed together for about 30 seconds by hand using a metal spatula to produce a slurry. 1.0 ml of the dispersant formed in Example 1 was added to the slurry using a disposable syringe, and then the slurry was hand-mixed for an additional 20 seconds. The cement slurry was then poured into the mini-slump cone discussed above until the mini-slump cone was filled to the top with the cement slurry. The mini-slump cone was lifted quickly and evenly from the glass plate, allowing the cement slurry to flow onto the glass plate. After waiting one minute, the diameter of the cement slurry patty formed was then measured. Generally speaking, the less viscous the cement slurry, the larger the slump diameter. The slump diameter was 16.8 cm.

EXAMPLE 4

100 grams of Portland cement was added to a disposable beaker. 35 grams of distilled water was added to the beaker and the Portland cement and distilled water were mixed together for about 30 seconds by hand using a metal spatula to produce a slurry. 1.5 ml of the dispersant formed in Example 1 was added to the slurry using a disposable syringe, and then the slurry was hand-mixed for an additional 20 seconds. The cement slurry was then poured into the mini-slump cone discussed above until the mini-slump cone was filled to the top with the cement slurry. The mini-slump cone was lifted quickly and evenly from the glass plate, allowing the cement slurry to flow onto the glass plate. After waiting one minute, the diameter of the cement slurry patty formed was then measured. Generally speaking, the less viscous the cement slurry, the larger the slump diameter. The slump diameter was 17.3 cm.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. An aqueous cementitious slurry comprising a hydratable solids portion and a dispersant comprising a sulfonated coal tar distillate salt polymer comprising a condensation product of an aldehyde and a sulfonated middle fraction comprising from about 40% to about 95% by weight naphthalene and from about 5% to about 60% by weight of a plurality of compounds selected from the group consisting of quinoline, indene, biphenyl, indane, acenaphthene, anthracene, phenanthrene, methyl naphthalene, cresol, phenol, xylenol, and tetralin.

2. The aqueous cementitious composition according to claim 1 wherein the hydratable solids portion comprises gypsum.

3. The aqueous cementitious composition according to claim 1 wherein the hydratable solids portion comprises Portland cement.

4. The aqueous cementitious composition according to claim 1 wherein the aqueous cementitious composition hardens to form concrete.

5. The cementitious composition according to claim 1 wherein the aqueous cementitious composition hardens to form mortar.

6. The cementitious composition according to claim 1 wherein the middle fraction that is used to prepare the sulfonated middle fraction distills at a temperature of from about 200±10° C. to about 250±10° C.

* * * * *

(12) EX PARTE REEXAMINATION CERTIFICATE (5920th)
United States Patent
Savoly et al.

(10) Number: US 6,863,837 C1
(45) Certificate Issued: Oct. 2, 2007

(54) DISPERSANT COMPOSITION

(75) Inventors: Arpad Savoly, Martinsville, NJ (US);
Dawn P. Elko, Flemington, NJ (US);
Bennie Veal, Rome, GA (US); Michelle L. McMahon, Sellersville, PA (US);
David B. Heller, Jr., North Wales, PA (US)

(73) Assignee: GEO Specialty Chemicals, Inc., Cleveland, OH (US)

Reexamination Request:
No. 90/007,574, Jun. 3, 2005

Reexamination Certificate for:
Patent No.: 6,863,837
Issued: Mar. 8, 2005
Appl. No.: 10/212,470
Filed: Aug. 5, 2002

(51) Int. Cl.
*C08G 16/00* (2006.01)
*C08G 8/10* (2006.01)
*C08G 16/02* (2006.01)
*C08G 8/00* (2006.01)

(52) U.S. Cl. .................... 252/1; 106/638; 106/713; 106/725; 106/739

(58) Field of Classification Search ............... None
See application file for complete search history.

(56) References Cited

U.S. PATENT DOCUMENTS

| | | | | |
|---|---|---|---|---|
| 2,121,845 A | * | 6/1938 | Wernick | 562/33 |
| 2,141,569 A | * | 12/1938 | Tucker | 106/725 |
| 2,227,999 A | * | 1/1941 | Brandt et al. | 562/32 |
| 2,529,602 A | * | 11/1950 | Frohmader | 521/39 |
| 3,067,243 A | * | 12/1962 | Richter | 562/88 |
| 3,193,575 A | * | 7/1965 | Nebel et al. | 562/88 |
| 3,277,162 A | * | 10/1966 | Johnson | 562/88 |
| 3,954,677 A | * | 5/1976 | Law | 516/77 |
| 4,156,615 A | | 5/1979 | Cukier | |
| 4,184,887 A | | 1/1980 | Lange et al. | |
| 4,290,973 A | * | 9/1981 | Aude et al. | 562/33 |
| 4,604,404 A | * | 8/1986 | Munson et al. | 514/494 |
| 4,744,882 A | | 5/1988 | Cukier et al. | |

(Continued)

FOREIGN PATENT DOCUMENTS

| | | |
|---|---|---|
| JP | 60-171257 | 9/1985 |
| JP | 1-176256 A | 7/1989 |
| JP | 04476256 * | 7/1989 |
| JP | 3-199149 | 8/1991 |
| RO | 80245 | 11/1982 |
| RO | 89194 | 3/1984 |

OTHER PUBLICATIONS

W.D. Betts, "Tar and Pitch", in Kirk–Othmer Encyclopedia of Chemical Technology, pp. 1–31, posted online Dec. 4, 2000.*

Kirk–Othmer Encyclopedia of Chemical Technology, 3d ed., vol. 4 (1978), pp. 437–448, John Wiley & Sons, New York.

*Primary Examiner*—Alan Diamond

(57) ABSTRACT

The present invention provides a sulfonated coal tar distillate salt polymer that is a condensation product of an aldehyde, preferably formaldehyde, and a sulfonated middle fraction obtained during coal tar distillation. The middle fraction includes from about 40% to about 95% by weight naphthalene and from about 5% to about 60% by weight of a plurality of compounds selected from the group consisting of quinoline, indene, biphenyl, indane, acenaphthene, anthracene, phenanthrene, methyl naphthalene, cresol, phenol, xylenol, and tetralin. The present invention also provides a method of forming a sulfonated coal tar distillate salt polymer. The method includes sulfonating the middle fraction to form a middle fraction sulfonic acid mass, optionally adding a first portion of water to the middle fraction sulfonic acid mass to form a mixture, reacting the mixture and an aldehyde to form a condensate, optionally adding a second portion of water to dilute the condensate, and adding a base to form a sulfonated middle fraction salt polymer. Sulfonated middle fraction salt polymers formed in accordance with the method of the invention are useful as dispersants and plasticizers in aqueous cementitious slurries.

U.S. PATENT DOCUMENTS 5,179,170 A * 1/1993 Ohtsu et al. ................. 525/285
5,534,166 A * 7/1996 Brueckmann et al. ......... 8/557
5,639,298 A * 6/1997 Miller et al. ................. 106/735
6,027,561 A * 2/2000 Gruber et al. .............. 106/718

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *